(12) United States Patent
Gonsalves et al.

(10) Patent No.: US 7,752,550 B2
(45) Date of Patent: Jul. 6, 2010

(54) SYSTEM AND METHOD FOR PROVIDING MANAGED POINT TO POINT SERVICES

(75) Inventors: Brian Gonsalves, Antioch, CA (US); Kenneth Roger Jones, Cool, CA (US); Zesen Chen, Pleasanton, CA (US)

(73) Assignee: AT&T Intellectual Property I, LP, Reno, NV (US)

( * ) Notice: Subject to any disclaimer, the term of this patent is extended or adjusted under 35 U.S.C. 154(b) by 119 days.

(21) Appl. No.: 10/669,171

(22) Filed: Sep. 23, 2003

(65) Prior Publication Data
US 2005/0064875 A1  Mar. 24, 2005

(51) Int. Cl.
*G06F 3/00* (2006.01)
(52) U.S. Cl. .......................... 715/738; 709/230; 705/26
(58) Field of Classification Search ................. 715/738, 715/739, 740, 741, 742, 744, 745, 746, 747; 709/230; 705/26; 725/91, 98, 118, 114; 370/252, 401
See application file for complete search history.

(56) References Cited

U.S. PATENT DOCUMENTS

| | | | | |
|---|---|---|---|---|
| 5,956,024 | A * | 9/1999 | Strickland et al. | 715/717 |
| 6,160,808 | A * | 12/2000 | Maurya | 370/389 |
| 6,278,738 | B1 * | 8/2001 | Park | 375/240.26 |
| 6,757,911 | B1 * | 6/2004 | Shimoji et al. | 725/136 |
| 6,792,457 | B1 * | 9/2004 | Zhang et al. | 709/224 |
| 6,813,777 | B1 * | 11/2004 | Weinberger et al. | 725/76 |
| 6,904,054 | B1 * | 6/2005 | Baum et al. | 370/467 |
| 7,054,291 | B2 * | 5/2006 | Balazinski et al. | 370/331 |
| 7,149,224 | B1 * | 12/2006 | Krishnamurthy | 370/401 |
| 2001/0055336 | A1 * | 12/2001 | Krause et al. | 375/240.11 |
| 2002/0044567 | A1 * | 4/2002 | Voit et al. | 370/467 |
| 2002/0082001 | A1 * | 6/2002 | Tanaka et al. | 455/414 |
| 2002/0184630 | A1 * | 12/2002 | Nishizawa et al. | 725/44 |
| 2003/0028890 | A1 * | 2/2003 | Swart et al. | 725/91 |
| 2003/0051026 | A1 | 3/2003 | Carter et al. | |
| 2004/0183749 | A1 * | 9/2004 | Vertegaal | 345/7 |
| 2004/0215770 | A1 * | 10/2004 | Maher et al. | 709/224 |
| 2005/0005190 | A1 * | 1/2005 | Ofir et al. | 714/4 |
| 2005/0008017 | A1 * | 1/2005 | Datta et al. | 370/392 |
| 2005/0063391 | A1 * | 3/2005 | Pedersen | 370/395.21 |
| 2005/0157711 | A1 * | 7/2005 | O'Dell et al. | 370/386 |
| 2005/0232193 | A1 * | 10/2005 | Jorgensen | 370/329 |
| 2005/0249210 | A1 * | 11/2005 | Heller | 370/389 |
| 2005/0265399 | A1 * | 12/2005 | El-Maleh et al. | 370/537 |
| 2006/0161643 | A1 * | 7/2006 | Senapati et al. | 709/220 |
| 2006/0293965 | A1 * | 12/2006 | Burton | 705/26 |
| 2007/0124488 | A1 * | 5/2007 | Baum et al. | 709/230 |

* cited by examiner

*Primary Examiner*—Ba Huynh
(74) *Attorney, Agent, or Firm*—Toler Law Group

(57) ABSTRACT

A system and method for providing managed point-to-point services are disclosed. In one embodiment of a system incorporating teachings of the present disclosure, a services management center may be capable of receiving a request for connection to a video content source. A requesting user may be part of one managed network and the content source may be part of another network. The content source may be able output an information stream. In operation, the center may determine an address for the video content source and initiate the formation of at least a portion of a point-to-point communication link between the requesting user and the video content source. In some embodiments, the center may be able to track a metric associated with communication of the information stream and may generate a billing record at least partially based upon the metric.

23 Claims, 3 Drawing Sheets

SYSTEM AND METHOD FOR PROVIDING MANAGED POINT TO POINT SERVICES

FIELD OF THE DISCLOSURE

The present disclosure relates to network management, and more particularly to a method for providing managed point to point services.

BACKGROUND OF THE DISCLOSURE

A network is made up of a series of nodes interconnected by communication paths. Networks often interconnect computing devices of differing types and networks of various sizes. An enterprise network, for example, may interconnect with several local area networks (LANs) and one or more metropolitan area networks (MANs) or wide area networks (WANs).

In practice, many large networks with broad geographic coverage, like the public Internet, are made by connecting some of the nodes on one network with nodes of another network. This intermingling of network assets actually helps create the broader network.

A given network may be characterized by several factors like who can use the network, the type of traffic the network carries, the typical nature of the network's connections, and the transmission technology the network uses. For example, one network may be public and carry circuit switched voice traffic while another may be private and carry packet switched data traffic. Whatever the make-up, most networks facilitate the communication of information between at least two nodes, and as such act as communications networks.

A difficulty may arise, however, when a user of a network attempts to communicate with a user or an information source on another network. Communication across the boundaries of the two networks may create challenges. For example, internetworking calls may require the advanced scheduling of bridges. Internetworking calls may need to be placed via dedicated lines at an additional cost, and internetworking calls may create difficult compatibility issues if, for example, the networks involved use different protocols to provide service. Additionally, internetworking calls using packetized transmission technologies like Transmission Control Protocol and Internet Protocol (TCP/IP) may face quality of service (QoS) challenges.

BRIEF DESCRIPTION OF THE DRAWINGS

The present invention is pointed out with particularity in the appended claims., However, features are described in the following detailed description in conjunction with the accompanying drawings in which:

DETAILED DESCRIPTION OF THE DRAWINGS

In recent years, the public Internet as well as other public and private networks have experienced appreciable growth in the number of hosts. Many of these hosts support Internet Protocol (IP). In some cases, these hosts may be interconnected at the LAN level using technologies like Ethernet and interconnected at the WAN level using an appropriate public data network (PDN) technology.

Interconnecting nodes of different networks may create several challenges. While IP may be a ubiquitously supported layer 3 protocol, creating reliable communication paths between devices on different networks, even when both networks support IP, may be difficult. Systems incorporating teachings of the present disclosure may allow for a managed point-to-point solution that facilitates connecting one network device to other network devices.

The amount of information available across networks like the Internet has grown tremendously in recent years. Content providers, which may include entities or individuals that make information available to network users, often place selectable content in a storage utility that is accessible through a web server. In operation, an individual network user directs a computing device to "request" the web server to deliver the available content to the user. In response to the request, the web server initiates communication of the requested content to an address associated with the user's device. Assuming the information the user wants is available and the user requests the information from an appropriate web server, this process may be effective.

Though effective, the process may present some challenges. For example, capturing, storing, and delivering content is often a costly exercise. While users may prefer to access "on-line" information for free, content providers may find it difficult to maintain a viable business in the absence of some content access fee. Similarly, content providers may not have an economical model for providing, managing and/or billing for point-to-point access to their content. Frustrations with the typical Internet experience may not be limited to content providers.

With the vast amount of information available, it often surprises network users to learn that the information they desire is not available or, at least, not easily accessible. A system incorporating teachings of the present disclosure may facilitate the interconnection of specific nodes within a broad network. In practice, such a network may allow a user to easily "connect" an information source to a complex network at one point and then connect to that information source from a different point. In some embodiments, users may effectively become their own content providers and/or establish content sources for themselves.

Figure 1:
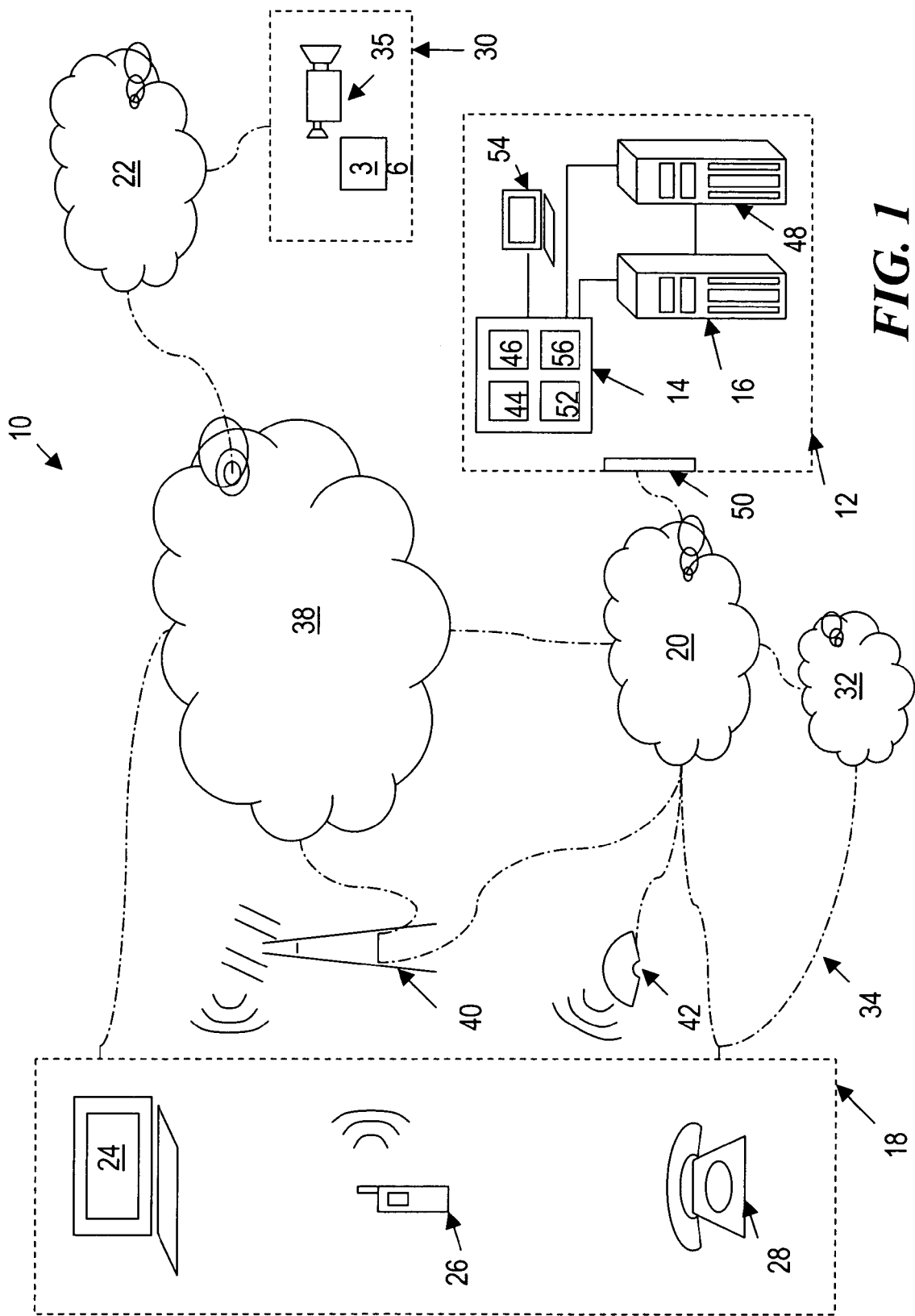
FIG. 1 shows a block diagram of an information content, delivery, and access system that incorporates teachings of the present disclosure.

As mentioned above in the brief description of the drawings, FIG. 1 shows a block diagram of an information content, delivery, and access system 10 that incorporates teachings of the present disclosure. System 10 includes a service management center SMC 12, which may operate in a service bureau mode and may facilitate the point-to-point interconnection of user devices and network attached content sources. As depicted, SMC 12 may contain several different components, which may include hardware, software, firmware, or combinations thereof.

In preferred embodiments, SMC 12 may employ and/or help establish Point-to-Point Protocol (PPP) connections between network devices. These PPP connections may include PPP over Ethernet (PPPOE) connections, PPP over ATM (PPPOA) connections, an/or some other variety of PPP connection. PPP may help provide a common technique for encapsulating IP packets for transmission over point-to-point links. SMC 12 may be capable of using PPP to assist in the handling of several relatively complex challenges including, for example, assignment and management of IP addresses, asynchronous and synchronous encapsulation, link configuration and quality testing, error detection, and data compression negotiation.

System 10 and SMC 12 may also employ a Link Control Protocol (LCP) and a family of Network Control Protocols (NCPs) to negotiate other configuration parameters and facilities. As depicted in FIG. 1, an architecture incorporating teachings of the present disclosure may provide centralized system monitoring, centralized support, centralized billing, and centralized scheduling. These advantages will preferably be provided in a bridge-independent, scheduling-independent, and network-independent manner. Some embodiments may allow for near real-time establishment of communication links between requesting users and content sources. The links established in near real-time may connect devices associated with the same or different networks or administrative domains.

For example, SCM 12 may be employed in connection with an H.323 network and may utilize a protocol component like H.225 Annex G. An overall H.323 network may consist of smaller subsets of equipment organized into administrative domains. If a user or endpoint in one administrative domain seeks to connect to a content provider serviced by another administrative domain, the H.225.0 RAS protocol may be able to facilitate communication between administrative domains.

Annex G may also be employed to assist SCM with address resolution, access authorization and usage reporting between administrative domains in H.323 systems. In practice, a network or domain border element may facilitate the exchange of information regarding the addresses a given network or domain can resolve. Addresses may be specified in a manner that effectively allows the requesting user's device or a network element supporting the device to determine an appropriate destination for the call. A connection server 14 may control access to connection information, and request reports on the usage made during calls to those addresses.

In the depicted embodiment, SCM 12 may include connection server 14, which may be communicatively coupled with and maintaining an information store 16. Information store 16 may be holding connection information for a collection of devices 18 associated with a managed internet protocol network 20 and additional connection information for other devices like video camera system 30 associated with a different managed internet protocol network 22. Managed networks 20 and 22 may be maintained separately by different service providers, may be different domains of a larger network, or may simply be geographically disperse branches of a larger network.

Devices included in collection 18 may include computers like laptop 24, wireless telephones like cell phone 26, wireline telephones like telephone 28, or some other electronic device capable of connecting to a network. In some embodiments, network and device types may affect how information is communicated. The connection or link type may also impact delivery of available information. For example, a user may connect to video camera system 30 across Public Switched Telephone Network 32. PSTN 32 may be made up of competitive local exchange carriers (CLECs), incumbent local exchange carriers (ILECs), which may be regional Bell operating companies (RBOCs), an interexchange carrier (IXC), or combinations thereof. In such cases, at least a portion of the connection may be "dial-up", and link 34 may communicatively connect a requesting device to PSTN 32 across a twisted pair connection and some appropriate backhaul to a central office.

In practice, the information communicated across the various links of FIG. 1 may be compressed and/or encrypted prior to communication. The communication may be via a circuit-switched network like most wireline telephony networks, a frame-based network like Fibre Channel, or a packet-switched network that may communicate using TCP/IP packets like Internet 38. The physical medium making up at least a portion of the links may be coaxial cable, fiber, twisted pair, an air interface, other, or combination thereof. In some embodiments, at least one of the links may be a broadband connection facilitated by an xDSL modem, a cable modem, an 802.11x device, some other broadband wireless linking device, or combination thereof.

In operation, a user of system 10 may want to establish a connection with video camera system 30. The user may send a signal representing this desire via managed network 20. Managed network 20 may interpret the request as a desire for a point-to-point connection with system 30 and may determine that system 30 is not connected to managed network 20. Managed network 20 may "ask" SCM 12 for help in connecting to system 30.

Connection server 14 of SCM 12 may determine that system 30 is associated with managed network 22. Connection server 14 may direct the retrieval of appropriate connection information from an information store like information store 16 and facilitate the creation and monitoring of a point-to-point connection between the user of managed network 20 and system 30. As depicted, system 30 may include a video camera 35 and an associated web server 36. System 30 may operate as a video content source and may be capable of outputting an information stream in response to a delivery request and discontinuing the output of the information stream in response to a cease request. System 30 may have associated connection information that may include a unique address and at least one connection rule.

In one embodiment, a point-to-point connection may be routed through public Internet 38 to managed network 22 and onto system 30. In preferred embodiments, SCM 12 may maintain appropriate connection information for various managed networks and be capable of tracking and/or storing various metrics associated with established point-to-point connections. These metrics may include, for example, connection duration, information throughput, quality of service, and peak bandwidth.

As mentioned above, at least a portion of the call may be made across a network like public Internet 38. The call connection may involve the communication of an IP packet or some other packet or frame and may be pure data communication, pure voice communication, or a combination data and voice communication. The voice portion of a combined call may involve the creation of a derived voice channel, a VoIP call, an instant messenger (IM) connection, some other technique, or a combination thereof.

As depicted in FIG. 1, a user may initiate and/or receive a connection request with cell phone 26. Use of cell phone 26 may involve communicating via a wireless network component 40, a portion of managed network 20, PSTN 32, public Internet 38, and/or combinations thereof. A wireless link type may depend on the electronic components associated with a given wireless access device and other wireless networking components like cellular towers or wireless local area network (LAN) hubs, like 802.11 hub 42.

The wireless access device, cellular tower and/or wireless hub (Wireless Enabled Devices) may include any of several different components. For example, a Wireless Enabled Device may have a wireless wide area transceiver, which may be part of a multi-device platform for communicating data using radio frequency (RF) technology across a large geographic area. This platform may be a GPRS, EDGE, or 3GSM platform, for example, and may include multiple integrated circuit (IC) devices or a single IC device.

A Wireless Enabled Device may also have a wireless local area transceiver, which may communicate using spread-spectrum radio waves in a 2.4 GHz range, 5 GHz range, or other suitable range. The wireless local area transceiver may be part of a multi-device or single device platform and may facilitate communication of data using low-power RF technology across a small geographic area. For example, if the wireless local area transceiver includes a Bluetooth transceiver, the transceiver may have a communication range with an approximate radius of one hundred feet. If the wireless local area transceiver includes an 802.11(x) transceiver, such as an 802.11(a)(b) or (g), the transceiver may have a communication range with an approximate radius of one thousand feet.

As mentioned above, whatever the device and/or network type, the connection information for a given device and/or network may include a unique address and a connection rule. The unique address may take the form of a Media Access Control (MAC) address and/or an IP address, like an IPv6 address, or some other unique identifier. In some embodiments, a MAC address may identify a unique hardware number associated with a given electronic device. A mapping engine like mapping engine 44 may maintain a correspondence table capable of relating an IP address to a MAC address. The MAC address may be usable by a Media Access Control sublayer of the Data-Link Layer (DLC) to help identify a physical device type, as there may be a different MAC sublayer for each physical device type.

Whatever the format of the unique address, a system like system 10 may employ static addresses, dynamic addresses, or combinations thereof. In addition, the uniqueness of an address may describe true uniqueness—in that a given device is the only device with that address or effective uniqueness. An effectively unique address may not be truly unique but may provide sufficient uniqueness to identify a given device.

As mentioned above, connection information may also include at least one connection rule. A connection rule may provide information relevant to the capabilities and/or preferences of a given device and/or network. For example, a connection rule may indicate an IP header rule defining, for example, appropriate header sizes; a real time transport protocol/real time control protocol (RTP/RTCP) rule defining, for example, how a device constructs and/or reconstructs data and how codec bit streams are packetized; an allowable sample size rule defining, for example, appropriate sizes as 10, 20, or 30 milliseconds; a supported coding rule defining, for example, that the called network supports a G.711, H.323, or other protocol; and/or, a network access rule defining, for example, that a called network should be accessed via the public Internet and what addresses should be used for specific content sources found in information store 16.

In some embodiments, mapping engine 44 may maintain a table that links addresses like dialed telephone numbers or keyed-in Uniform Resource Locators (URLs) to a unique address of an available device. In operation, connection server 14 may receive a query from managed network 20 seeking appropriate connection information for system 30, which may be associated with managed network 22. In one embodiment, connection server 14 may collect the appropriate connection information from information store 16 and initiate creation of a point-to-point link that utilizes the appropriate connection information. Metrics associated with an established point-to-point connection may be tracked with metric engine 46.

In some embodiments, connection server 14 may have a zoned information store including a first collection of connection information for a first plurality of callable devices associated with managed network 20 and a second collection of connection information for a second plurality of callable devices associated with managed network 22. As depicted in FIG. 1, the first collection may be located in information store 16 and the second collection may be located in information store 48. Though depicted as separate hardware components, zoning may be accomplished in software as well.

By zoning the information store, SCM 12 may allow a managed network or its administrator to access and modify the connection information maintained in the information store. For example, an administrator of managed network 22 may need to modify the connection information maintained in information store 48 for system 30. To allow for such modifications, SCM 12 may include a network interface engine like interface engine 50. Interface engine 50 may be communicatively coupled to communication server 14 and may be capable of receiving a query seeking appropriate connection information or modifying connection information for a given device. In some embodiments, interface engine 50 may be designed such that it does not act as a point of interconnection for either signaling or bearer traffic between managed network 20 and managed network 22.

In light of the potential authority granted to a remotely located administrator, a system incorporating teachings of the present disclosure may elect to use some rights management technique. For example, a system like system 10 may employ a security engine 52, which may be made up of an authentication engine and an authorization engine. In practice, the authentication engine may be communicatively coupled to interface engine 50. The authentication engine may be able to compare an initial set of credentials received from the calling party against a maintained set of credentials. The credentials may include, for example, a user name and password combination. If the received credentials match the maintained credentials, the authorization engine may grant access to information store 16. In preferred embodiments, security engine 52 may recognize that the authorized administrator is administering managed network 20 and, as such, only grant the administrator access to information store 16—holding back from the administrator edit rights to the information in information store 48. Altering information in SCM 12 may also be accomplished locally. For example, SCM 12 may include a management console 54 from which a local administrator may manage SCM 12, mediation server 14, information stores 16 and 48, and/or m ore than one of these components.

In operation, connection server 14 may also include a find and retrieval engine (FRE) 56. FRE 56 may be communicatively coupled to interface engine 50 and capable of determining if a called device is associated with managed network 20 or managed network 22. Making such a determination may "tell" FRE 56 which zone of the information store holds the appropriate connection information. In practice, FRE 56 may be associated with mediation server 14 and may be capable of directing collection of the appropriate connection information from information store 16.

System 10 and SCM 12 may perform several additional functions with the components listed above or other dedicated components. Connection server 14 may include a registration engine associated with information store 16 that maintains a menu of available content sources including system 30. Connection server 14 may also have an access engine that recognizes a signal indicative of a user input from a user device.

The user input may include an address for system 30 and may indicate a desire to receive an information stream from system 30.

SCM 12 and connection server 14 may also include a network services engine communicatively coupled to the access engine and capable of initiating establishment of at least a portion of a point to point communication link between a requesting device and system 30. The network services engine may also work with metric engine 46 to track a metric associated with user access to the information stream.

In some embodiments, connection server 14 and mapping engine 44 may control functions like Address translation; Bandwidth Control; Signaling Control; as well as link authorization and management. Address Translation may be applied to calls involving an H.323 network. For example, managed network 20 may be an H.323 network that uses an alias to address destination terminals. Calls originating outside managed network 20 may use one type of alias address like a Uniform Resource Locator (URL) to identify an available content source. The URL or other alias may be translated into an appropriate network address for the content source. Preferably, the content source will be reachable using the network address on managed network 22.

Connection server 14 may also provide support for bandwidth control by using tools like RAS messages, bandwidth request (BRQ), confirm (BCF), and reject (BRJ). If, for example, a network manager for managed network 20 has specified a threshold for the number of simultaneous connections for the network or a content source on the network, connection server 14 may refuse to make any more connections once the threshold is reached. The result may be to limit the total allocated bandwidth to some fraction of the total available, leaving the remaining bandwidth for other applications and/or devices.

Connection server 14 may also route call-signaling messages between endpoints. In a point-to-point conference, connection server 14 may facilitate the processing of H.225 call-signaling messages. In some embodiments, connection server 14 may allow endpoints to send H.225 call-signaling messages directly to each other.

In some embodiments, connection server 14 and metric engine 46 may accept or reject connection requests. They may maintain information about active calls and track use metrics for users and/or content sources within a given zone. In preferred embodiments, connection server 14 may also be capable of rerouting connections to different endpoints to achieve load balancing.

Figure 2:
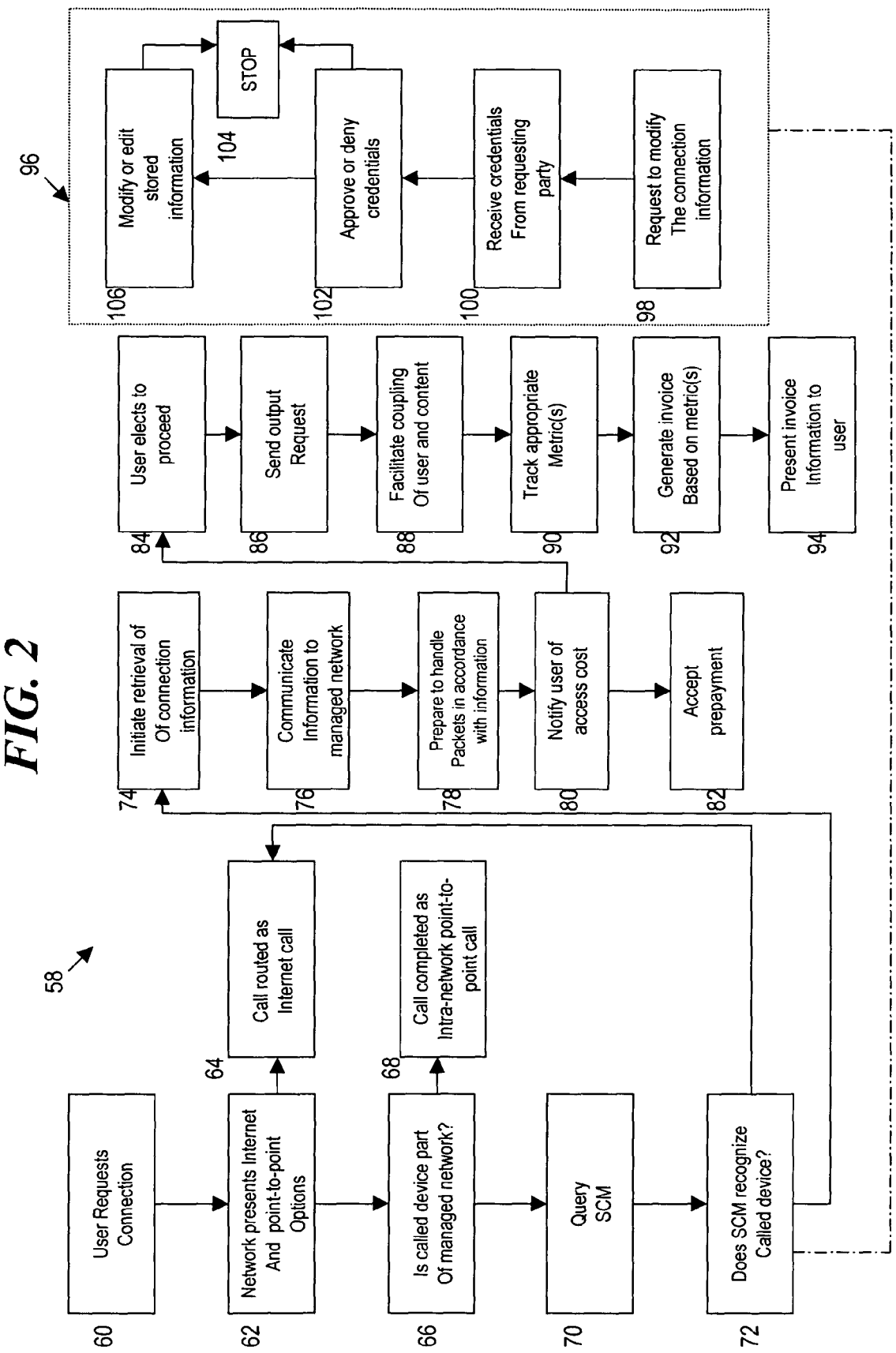
FIG. 2 depicts a simplified flow chart representing the operation of a managed point-to-point system that incorporates teachings of the present disclosure.

Operation of a system like system 10 may be better understood in connection with a description of FIG. 2. As mentioned above, FIG. 2 depicts a simplified flow chart representing the operation of a managed point-to-point system that incorporates teachings of the present disclosure. Routine 58 of FIG. 2 may start at step 60, at which point a managed network may receive a signal indicating a request for connection to a video content source operable to output an information stream.

At step 62, the system may present the requesting party with connection options including completion via a managed point-to-point communication link or via a packet switched public Internet link. If the user selects Internet call completion, routine 58 may progress to step 64 and the call may be routed to the Internet. If the user selects managed point-to-point completion, routine 58 may progress to step 66, where the managed network receiving the initial call request may determine whether or not the called content source is part of its managed network. If the content source is on the same managed network as the requesting device, routine 58 may progress to step 68 where the call is completed across the one managed network using an appropriate point-to-point connection.

If the content source is not on the same managed network or domain as the requesting device, routine 58 may progress to step 70 where a query is sent to an information store maintained at an SCM like SCM 12 of FIG. 1. The query may effectively "ask" the SCM if the SCM "knows" how to connect to the content source. The content source may be identified by a telephone number or some other identifier, and the original managed network may need to have that telephone number converted into a unique IP and/or MAC address. The original managed network may also need to know what connection rules, if any, exist for the content source and/or network associated with the content source.

At step 72, the SCM may determine whether it "knows" and/or can "find" an entry for the content source. In some embodiments, an SCM may zone its information stores to isolate the connection information of one managed network from the connection information of another managed network. In such an embodiment, step 72 may include determining which collection of connection information includes the appropriate connection information for the content source.

If the SCM cannot find the content source at 72, this condition may be reported back to the original managed network and routine 58 may progress to step 64 where the call is routed at least partially via an Internet link. If the SCM can find the content source, routine 58 may progress to step 74 where the SCM initiates retrieval of appropriate connection information for the content source.

As mentioned above, the system may recognize and determine an address for the video content source at step 60. In one embodiment, a user may have requested information from a content source by "pointing" a browser at the URL of a web server associated with the content source. The request may take other forms. For example, the request may have been a dual tone multi-frequency signal, a TCP/IP packet, and/or a voice signal, in which case the system may receive a spoken directive from a calling part and convert the spoken directive into the request for connection. With each of these request forms, a user may identify the content source with an address like a URL or phone number. As a part of step 74, the system may convert the received address to a unique address of the desired content source by referring to a maintained list of available content sources.

At step 76, the SCM may initiate communication of the appropriate connection information to the original managed network. At step 78, the original managed network may ready itself to manipulate, receive and/or route packets in accordance with the connection information received from the SCM. At step 80, the system may notify the user requesting connection to the content source of a cost associated with the desired access. In some cases, the cost may be fixed and/or the user may elect to prepay for the connection. In such a system, routine 58 may progress to step 82 and the system may accept a prepayment input from the user indicating an acceptable method of paying the cost prior to initiating formation of a point-to-point communication link.

A system following routine 58 may also allow a user to establish the point-to-point connection in a non-fixed and/or non-prepaid fashion. If the user selects this approach, routine 58 may progress to step 84 at which point the user acknowledges a desire for the connection and a willingness to pay for the connection. The system may again accept a payment input from the user indicating a desired method of paying the cost.

At step 86, routine 58 may initiate the sending of an output request to the content source. For example, if the content source is a video content source like system 30 of FIG. 1, the system executing routine 58 may be capable of toggling the video content source between an output and no-output state. The system may also be capable of directing the content source to output the stream as a variable bit rate stream or a constant bit rate stream. The system may also be capable of directing the conversion of an outputted variable bit rate stream into a constant bit rate stream.

At step 88, routine 58 may communicatively couple or initiate communicatively coupling of the user and the content source. The communication link may include at least one PPP link like point-to-point protocol over Ethernet link and/or point-to-point over asynchronous transfer mode link. At step 90, the system may begin tracking a metric associated with communication of the information stream. The metric may include information throughput, connection duration, quality of service, and/or peak bandwidth.

At step 92, the system may generate a billing record at least partially based upon the metric or metrics being tracked. And, at step 94, the user may be informed of the to-be-billed amount.

As mentioned above, if the SCM cannot find the called device at step 72, this condition may be reported back to the original managed network and routine 58 may progress to step 64 where the requested link is completed across a public Internet link without consideration for QoS or other service needs. The "not known" determination may also indicate the need for a modification routine 96. At step 98 of modification routine 96, the SCM may receive a request to modify a collection of connection information. At step 100, the SCM may request and receive credentials from a party or administrator making the request. At step 102, the credentials may be compared against a maintained list of credentials and the party may be allowed editing access to an information store holding the to-be-changed connection information. If the credentials are not accepted, modification routine 96 may progress to step 104, where the routine stops.

If the credentials are accepted, modification routine 96 may progress to step 106 where the party is granted editing access to an information store or a specific zone of the information store and the party modifies the appropriate connection information. In some embodiments, the information stores may be zoned such that allowing the party access to a first collection of connection information does not automatically allow the party access to all of the connection information maintained at the SCM. The party may then exit from the SCM system and modification routine 96 may progress to a stop at step 104.

Various managed networks may use the connection information provided by an SCM in several different ways. The information may simply be used to create and manage point-to-point communication links. In some embodiments, a system incorporating teachings of the present disclosure may be able to adapt information exchange to a given device, to a user preference, and/or network state or other condition. A managed network may include a format converter that can translate in accordance with the appropriate connection information at least a portion of the requested content into a signal and/or signal type receivable by a called device on a different managed network. There may be several mark-up languages and techniques employed in a system like system 10 to facilitate this and other capabilities. For example, a designer of system 10 may elect to use XHTML, SMIL or some other mark-up language in conjunction with a speech recognition engine. Other designers may elect to use VoiceXML, HTML, Voice Browser, Xforms, and/or others.

In preferred embodiments, a format converter, which may be a stand alone engine or an asset incorporated into another engine, may be capable of translating at least a portion of a first signal representing a content source output into a second signal that also represents the output, the second signal receivable by the called device and network.

In some embodiments, various pieces of information in addition to or in lieu of a near real-time data stream may be communicated in a format that facilitates display on a graphical user interface. The information may be sent as a file for download and play, as streaming content, as some other format, or some combination thereof. The information may include audio information, textual information, video information, some other type of information, or a combination thereof. As such, in some systems incorporating teachings of the present disclosure, an information store may include connection information that includes, among other things, information describing display capabilities and additional address information for different devices capable of receiving additional information.

Figure 3:
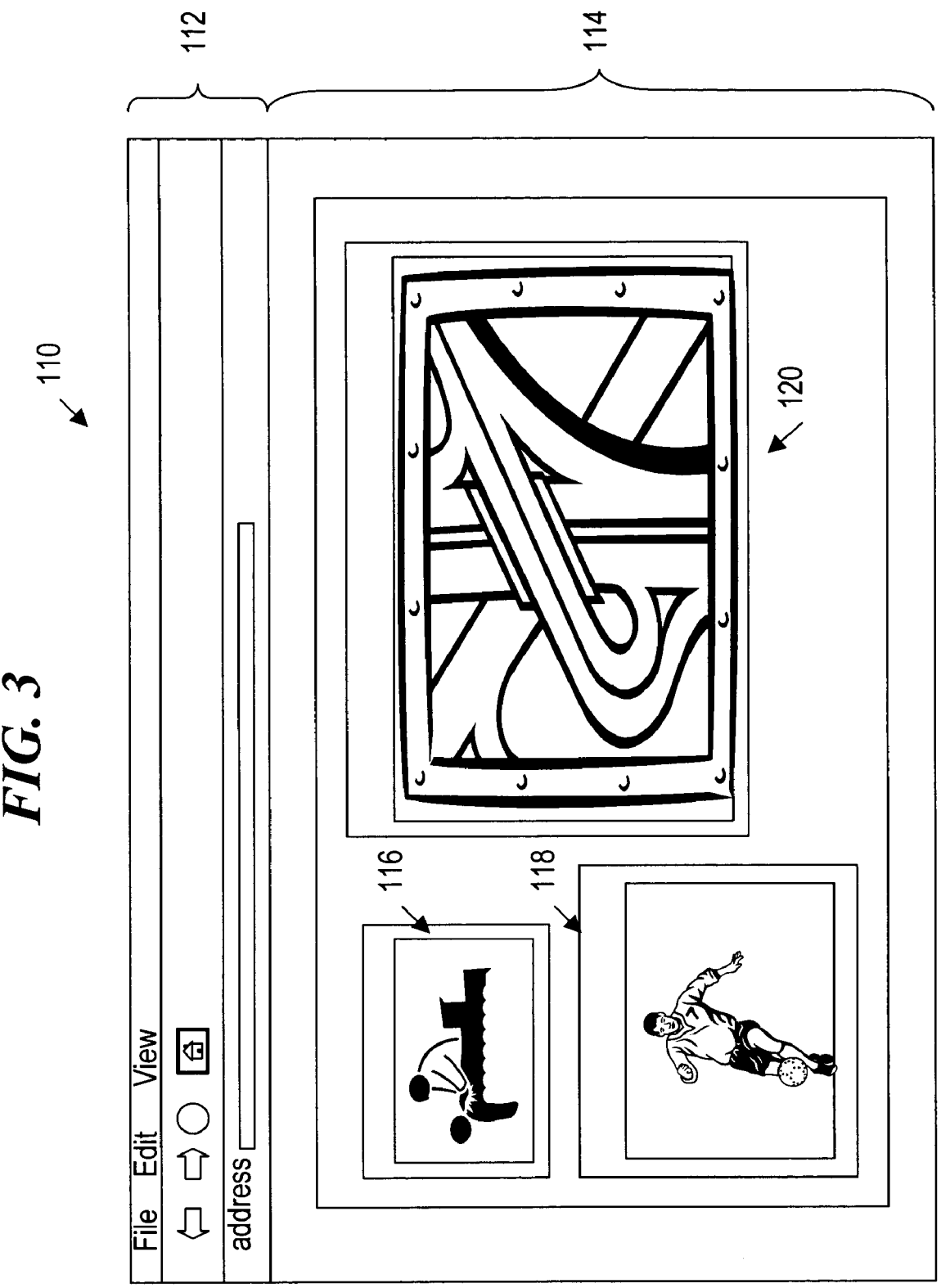
FIG. 3 depicts a representative graphical user interface that may be used when accessing a managed point-to-point service provided in accordance with teachings of the present disclosure.

FIG. 3 depicts a representative graphical user interface (GUI) that may be used when accessing a managed point-to-point service provided in accordance with teachings of the present disclosure. GUI 110 may be presented within a display associated with an access device. GUI 110 may include a browser bar portion 112 and a display portion 114. Display portion 114 may contain several active windows 116, 118, and 120. As depicted, window 116 may be associated with a video content source capturing a doctor's office scene. Window 118 may present a near real-time video stream of a sporting event, and window 120 may allow a user to observe the traffic conditions of a local highway interchange. A system incorporating teachings of the present disclosure may allow a user to open, close, and/or modify windows of GUI 110. Examples of other desirable scenes may include a day care center, a home surveillance scene, or others.

Many of the above techniques may be provided by a computing device executing one or more software applications or engines. The software may be executing on a single computing platform or more than one. The platforms may be highly capable workstations, personal computers, microprocessors, servers, or other devices capable of performing the techniques. The platforms may execute commands maintained in a computer-readable medium. In one embodiment of an SCM, platform or collection of platforms may be executing commands described in computer-readable data to receive a request for connection to a video content source operable to output an information stream, to determine an address for the video content source, to initiate formation of at least a portion of a point to point communication link with the video content source, to issue a notification of a cost associated with accessing the video content source, to accept a prepayment input indicating a method of paying the cost, to track a metric associated with communication of the information stream, and to generate a billing record at least partially based upon the metric.

It will be apparent to those skilled in the art that the disclosed embodiments may be modified in numerous ways and may assume many embodiments other than the particular forms specifically set out and described herein. For example, embodiments may be employed with voice networks, data networks, other communications networks, or combinations thereof.

Accordingly, the above disclosed subject matter is to be considered illustrative, and not restrictive, and the appended claims are intended to cover all such modifications, enhancements, and other embodiments that fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A network services method comprising:
receiving a request for connection to a video camera system in a first network of multiple networks, wherein the video camera system is operable to output a video stream captured by a video camera of the video camera system;
determining an address for the video camera system;
sending data to a user device in a second network of the multiple networks;
receiving a response including a selected connection option;
when the selected connection option is an Internet connection option, facilitating an Internet connection between the user device in the second network of the multiple networks and the video camera system;
when the selected connection option is a point-to-point connection option and the video camera system is reachable via point-to-point communication, facilitating formation of at least a portion of a point-to-point protocol communication link between the user device in the second network of the multiple networks and the video camera system;
when the selected connection option is the point-to-point connection option and the video camera system is not reachable via point-to-point communication, facilitating the Internet connection between the user device in the second network of the multiple networks and the video content system;
tracking a metric associated with communication of the video stream captured by the video camera of the video camera system between the first network and the second network; and
generating a billing record at least partially based upon the metric associated with communication of the video stream captured by the video camera of the video camera system between the first network and the second network.

2. The method of claim 1, further comprising:
notifying an entity initiating the request of a cost associated with accessing the video camera system; and
accepting a payment input from the entity initiating the request indicating a method of paying the cost prior to initiating formation of the at least a portion of the point-to-point communication link.

3. The method of claim 1, further comprising:
receiving a spoken directive from a calling party; and
converting the spoken directive into the request for connection.

4. The method of claim 1, further comprising:
notifying an entity initiating the request of a cost associated with accessing the video camera system.

5. The method of claim 1, wherein the video stream captured by the video camera of the video camera system comprises a variable bit rate stream, the method further comprising converting the variable bit rate stream into a constant bit rate stream.

6. The method of claim 1, further comprising sending a delivery request to the video camera system, wherein the video camera system is operable to output the video stream captured by the video camera of the video camera system in response to the delivery request.

7. The method of claim 6, wherein the video camera system further includes a web server that is associated with the video camera, and wherein the video stream captured by the video camera is output via the web server in response to the delivery request.

8. The method of claim 7, further comprising sending a cease request to the video camera system, wherein the web server is operable to discontinue the output of the video stream captured by the video camera in response to the cease request.

9. The method of claim 1, wherein at least a portion of the request comprises a format selected from the group consisting of a dual tone multi-frequency signal, a TCP/IP packet, and a voice signal.

10. The method of claim 1, wherein the metric associated with communication of the video stream is tracked during communication of the video stream.

11. The method of claim 1, wherein the metric includes call duration, information throughput, quality of service, peak bandwidth, or any combination thereof.

12. The method of claim 1, further comprising:
determining a number of simultaneous connections to the video camera system;
determining whether the number of simultaneous connections exceeds a threshold number of simultaneous connections; and
when the number of simultaneous connections is less than the threshold number of simultaneous connections, accepting the request for connection to the video camera system.

13. The method of claim 12, further comprising rejecting the request for connection to the video camera system when the number of simultaneous connections exceeds the threshold number of simultaneous connections.

14. The method of claim 1, wherein the video camera captures a day care facility video stream.

15. The method of claim 1, wherein the video camera captures a home surveillance video stream.

16. The method of claim 1, wherein the video camera captures a video stream of traffic conditions.

17. A computer-readable medium storing computer-readable executable instructions to:
receive a request for connection to a video camera system in a first network of multiple networks, wherein the video camera system is operable to output a video stream captured by a video camera of the video camera system;
determine an address for the video camera system;
send data to a user device in a second network of the multiple networks, the data associated with a plurality of connection options associated with the video camera system, the plurality of connection options including a point-to-point connection option and an Internet connection option;
receive a response including a selected connection option;
when the selected connection option is the Internet connection option, initiate an Internet connection between the user device in the second network of the multiple networks and the video camera system;
when the selected connection option is the point-to-point connection option and the video camera system is reachable via point-to-point communication, initiate formation of at least a portion of a point-to-point communication link between the user device in the second network of multiple networks and the video camera system;
when the selected connection option is the point-to-point connection option and the video camera system is not reachable via point-to-point communication, initiating the Internet connection between the user device in the second network of the multiple networks and the video camera system;

issue a notification of a cost associated with accessing the video camera system;

accept a prepayment input indicating a method of paying the cost;

track a metric associated with communication of the video stream captured by the video camera of the video camera system between the first network and the second network; and generate a billing record at least partially based upon the metric associated with communication of the video stream captured by the video camera of the video camera system between the first network and the second network.

18. The method of claim 1, wherein the request for connection is received at a network management system, the method further comprising retrieving connection information from an information store maintained by the network management system, wherein the connection information includes the address of the video camera system and at least one connection rule to connect to the video camera system.

19. The computer-readable medium of claim 17, wherein the metric associated with communication of the video stream is tracked during communication of the video stream.

20. A network services method comprising:

receiving a request to connect to a video camera system in a first network of multiple networks, wherein the video camera system includes a video camera and a web server that is associated with the video camera, wherein the web server is operable to output a video stream captured by the video camera of the video camera system;

determining a number of simultaneous connections to the video camera system;

determining whether the number of simultaneous connections exceeds a threshold number of simultaneous connections;

when the number of simultaneous connections is less than the threshold number of simultaneous connections, sending a delivery request to the video camera system, wherein the video stream captured by the video camera is output via the web server in response to the delivery request;

sending data to a user device in a second network of the multiple networks, the data indicating a plurality of connection options to connect to the video camera system, the plurality of connection options including a point-to-point connection option and an Internet connection option;

receiving a response including a selected connection option;

when the selected connection option is the Internet connection option, initiating an Internet connection between the user device in the second network of the multiple networks and the video camera system;

when the selected connection option is the point-to-point connection option and the video camera system is reachable via point-to-point communication, initiating formation of at least a portion of a point-to-point protocol communication link between the user device in the second network of multiple networks and the video camera system; and when the selected connection option is the point-to-point connection option and the video camera system is not reachable via point-to-point communication, initiating the Internet connection between the user device in the second network of the multiple networks and the video camera system.

21. The network services method of claim 20, further comprising rejecting the request to connect to the video camera system when the number of simultaneous connections exceeds the threshold number of simultaneous connections.

22. The network services method of claim 20, further comprising:

issuing a notification of a cost associated with accessing the video camera system;

tracking a metric associated with communication of the video stream captured by the video camera of the video camera system, wherein the metric includes call duration, information throughput, quality of service, peak bandwidth, or any combination thereof; and generating a billing record at least partially based upon the metric.

23. The network services method of claim 20, further comprising sending a cease request to the video camera system, wherein the web server is operable to discontinue the output of the video stream captured by the video camera in response to the cease request.

* * * * *